J. W. MORRISON.
WATER PURIFIER.
APPLICATION FILED NOV. 14, 1908.
938,778.
Patented Nov. 2, 1909.
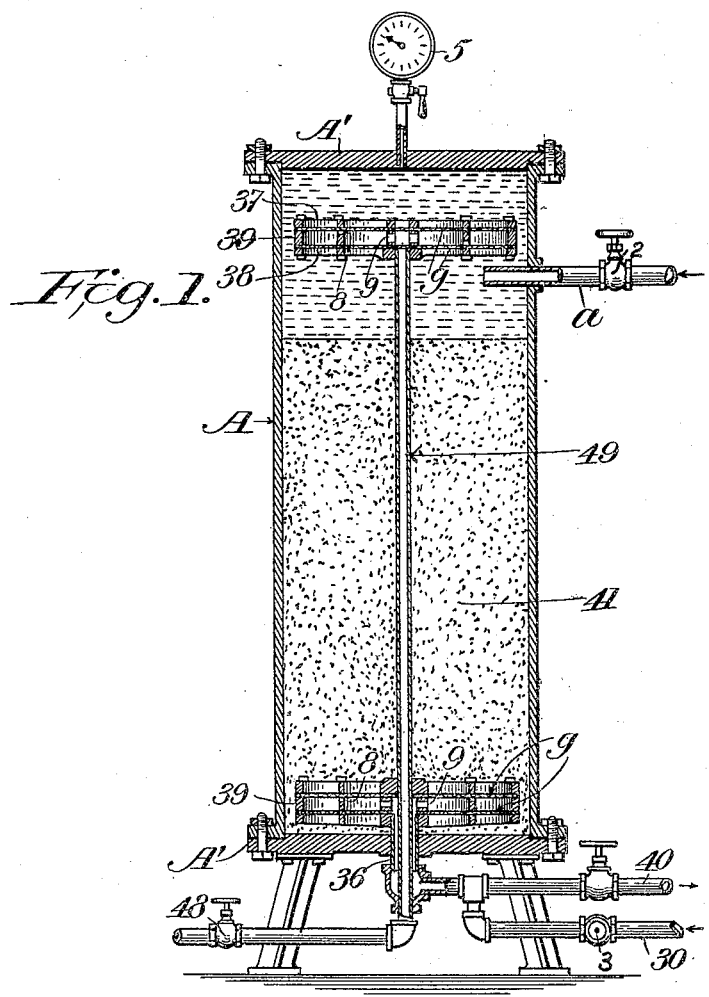
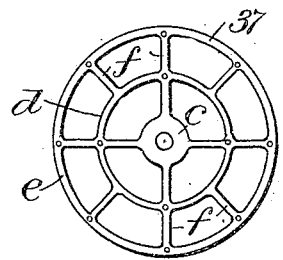
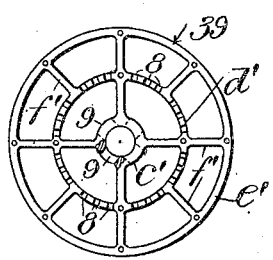
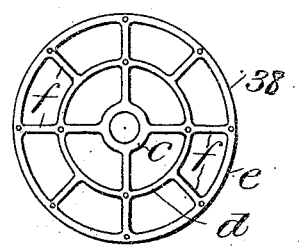
Fig. 2.   Fig. 3.   Fig. 4.
Witnesses
C. H. Walker
A. E. Powell
Inventor
James W. Morrison
By T. Walter Fowler
Attorney

UNITED STATES PATENT OFFICE.

JAMES W. MORRISON, OF BATAVIA, NEW YORK, ASSIGNOR TO STEAM APPLIANCE MANUFACTURING COMPANY, OF BATAVIA, NEW YORK, A CORPORATION OF NEW YORK.

WATER-PURIFIER.

938,778.  Specification of Letters Patent.  Patented Nov. 2, 1909.

Application filed November 14, 1908. Serial No. 462,582.

*To all whom it may concern:*

Be it known that I, JAMES W. MORRISON, a citizen of the United States, residing at Batavia, in the county of Genesee and State of New York, have invented certain new and useful Improvements in Water-Purifiers, of which the following is a specification.

My invention relates to certain new and useful improvements in mechanical means for purifying or filtering water and particularly the feed water for boilers; and my invention consists of the parts and the constructions, arrangements and combinations of parts which I will hereinafter describe and claim.

In the accompanying drawings forming part of this specification and in which similar reference characters indicate like parts in the several views:—Figure 1 is a vertical sectional view of a water purifier embodying my invention, Figs. 2, 3 and 4 represent plan views of the screen supporting frames.

In the said drawings A, indicates a cylinder which may represent any tank or vessel adapted to contain the water or other fluid to be filtered, said cylinder being of metal or other suitable material and having such dimensions as will best adapt it to the particular purposes I have in view.

The cylinder is provided with end heads A' which are suitably bolted or otherwise removably secured to flanged portions on the ends of the cylinder; the water or other fluid to be purified is admitted to the cylinder through a pipe *a*, which in the case of filtering boiler feed-water, may lead from a heater or other preliminary portion of the purifying system, said pipe having a controlling valve 2.

Within the cylinder or tank sand or other suitable granular material 41 is placed to form a filter bed; in the present instance I show this granular filtering material as filling only about three-fourths of the interior area of the cylinder, thereby leaving sufficient space in the cylinder above the filter-bed for the movement of the particles of the granular material when water is admitted from below to cleanse and flush the filter, for it is found that when space is thus afforded for flushing purposes, the ebullition of the granular material under the high pressure of the water admitted thereto, causes the particles of material to loosen up and be agitated and exposed to the cleansing action of the water so that the foreign substances which are adhering to the filtering material will be more quickly and thoroughly filtered from the water and delivered from the cylinder or tank.

In practice, the water from the heater or other source enters the cylinder through the pipe *a* and percolates through the granular filter bed and the strainer below the same and finally enters the pipe 36 and is delivered therefrom to the boiler by means of the valve-controlled pipe 40.

Connecting with the pipe 40 is a valve-controlled pipe 30 through which a reverse current of water is admitted to the pipe 36 and thence delivered upwardly through the lower strainers and the granular filter bed to loosen up and wash the latter, as before described, the loosened particles of foreign matter being carried into the reserved space above the filter bed and the water thence passing through a strainer disposed in the space above the bed and finally passing out through a blow-off pipe 49 having a controlling valve 48.

A pressure gage, 5, is fitted to the top of the cylinder or vessel and communicates with the space above the filter bed to indicate a variation in pressure within the filter due to added friction caused from accumulation of foreign matter on or in the filter bed, thus visually indicating when it becomes necessary to reverse the flow of water and cleanse the filter.

The strainers shown in the upper and lower portion of the cylinder, or vessel A may be of the same or different construction and of any well known form adapted for my purposes, I prefer, however, to make the strainers substantially as follows: Suitable frames or spiders, 37, 38, are each made with a central hub *c*, rings, *d*, *e* and radial arms *f*, as shown in Figs. 2 and 4, and a suitable light, fine wire mesh or other screen-material *g*, having the property of preventing foreign matter in the water passing through it, is placed at one side of each of the frames so as to inclose an intermediate clear-water chamber. As the fine screen-material would not of itself possess sufficient strength to support the weight of the filter bed, 41, or the pressure of the water, I reinforce the same by placing between the frames 37, 38, a separating frame or spider 39 as shown in Fig. 3 said frame 39 comprising inner and outer concentric rings $d'$, $e'$, and a central hub $c'$ and radial arms $f'$, said reinforcing frame and the frames 37, 38 being secured together, and the annular ring $d'$, and hub $c'$, of the separating frame having lateral passages 8—9, which connect with the clear-water space between adjacent screens and which space is inclosed by the outside band $e'$, of the separating frame 39. The screen frames and separating frame may be joined as a rigid structure by bolting the frames together; this also firmly secures the fine screen-material $g$ at its edges and intermediate portions so that it will better resist the weight of the filter-bed and the pressure of water. The blow-off pipe 49 extends between and connects the upper and lower double-strainers before mentioned and is fixed to the lower frame of the upper strainer and the upper frame of the lower strainer, said pipe also passing through the hub of the separating frame of the lower strainer and through the discharge pipe 36, upon the upper end of which latter pipe the lower frame 38 of the lower strainer is supported.

In operation, the water enters the cylinder through the pipe $a$ and passes down through the granular filter-bed and the strainer material held between the frames 37—38 and 39, and into the clear-water space inclosed by the separating frame 39, and finally passes out through the lateral passages 8 and 9 therein into the pipe 36 for transmission to the boiler. When the filter is to be cleaned, the water is admitted to the pipe 30, the valve 3, of which is now open, and flows upwardly through the pipe, 36, the passages 8 and 9, the strainer material, the filter bed and the double strainer above the same, and through the latter and into the blow-off pipe 49, carrying such accumulation of foreign matter as was contained on top of and in the filter bed. By employing the double strainer and supporting the lower strainer above the bottom of the cylinder as shown, the water is permitted to pass down on the outer side and up through from the under side, which is not choked, due to any weight from the filter-bed, thereby greatly reducing friction and facilitating the separation of foreign substances from the water.

Having thus described my invention what I claim as new and desire to secure by Letters Patent is:—

1. In a water purifier, the combination of a vessel adapted to receive the water to be purified, a granular filter-bed therein and partially filling the same, strainers in the upper and lower portions of the vessel one of said strainers underlying the filter-bed and the other strainer being supported above the normal level of said bed, and a pipe extending between the upper and lower strainers and forming a support for the upper strainer, an inlet pipe leading into the vessel above the level of the filter-bed and a discharge pipe receiving the water which passes through the lower strainer.

2. In a water purifier, the combination of a vessel adapted to receive the water to be purified, said vessel containing a granular filter bed which only partially fills it, concentric discharge pipes entering the bottom of the vessel, one of said pipes terminating near the bottom of the vessel and the other pipe extending through the filter bed to a point above the same, and hollow strainers fixed to the upper ends of said pipes, said pipes having their upper ends in open communication with the interior of the strainers.

3. In a water purifier, the combination of a vessel adapted to receive the water to be purified, said vessel containing a granular filter bed which only partially fills it, concentric discharge pipes entering the bottom of the vessel, one of said pipes terminating near the bottom of the vessel and the other pipe extending through the filter bed to a point above the same, and hollow strainers fixed to the upper ends of said pipes, said pipes having their upper ends in open communication with the interior of the strainers, one of said pipes serving as a discharge for filtered water and also as an inlet for flushing water, and the other pipe serving as a blow-off for accumulated foreign matter carried by the flushing water.

4. In a water-purifier, the combination with a vessel adapted to receive the water to be purified, said vessel containing a granular filter-bed which only partially fills it, and upper and lower double-strainers, said upper strainer being disposed in the space above the filter-bed, and said lower strainer underlying the filter-bed, each of said strainers having an interior chamber, a discharge pipe for supporting the lower strainer, and a discharge pipe extending to the upper portion of the filter and supporting the upper strainer.

5. In a water purifier, the combination of a vessel adapted to receive water to be purified, a filter medium therein, a discharge pipe entering the bottom of the vessel and terminating at a point above the same, and a hollow strainer fixed to the upper end of said pipe, said strainer including open frames and reticulated material and an open frame introduced between the strainer frames and separating the latter to form an intermediate chamber, said discharge pipe communicating with said intermediate chamber.

6. In a water purifier, the combination of a vessel adapted to receive the water to be purified, a filter medium therein, a discharge pipe leading through the bottom of the vessel to a point above the same, a strainer to which said pipe is fitted, said strainer including upper and lower open frames and reticulated material and an open frame intermediate of the other frames, said separating frame inclosing a clear water chamber, each of said frames having concentric rings and one of said rings of the separating frame and the hub thereof having lateral passages which connect with said discharge pipe.

7. In a water purifier, the combination with a discharge pipe, of a double strainer supported thereon, said strainer consisting of upper and lower and intermediate members each having a central hub and concentric inner and outer rings connected by radial arms and a reticulated material between said upper and lower and intermediate members; and bolts for rigidly uniting said members, said intermediate member having its hub-portion and interior ring each provided with radial openings leading to the open end of the discharge pipe.

In testimony whereof I affix my signature in presence of two witnesses.

JAMES W. MORRISON.

Witnesses:
 ALLEN TILLAPAUGH,
 ARTHUR ROGERS.